(12) United States Patent
Chang

(10) Patent No.: US 9,630,450 B1
(45) Date of Patent: Apr. 25, 2017

(54) HOLLOW CASTOR FOR SUITCASE

(71) Applicant: Tsung-Yuan Chang, Changhua (TW)

(72) Inventor: Tsung-Yuan Chang, Changhua (TW)

( * ) Notice: Subject to any disclaimer, the term of this patent is extended or adjusted under 35 U.S.C. 154(b) by 0 days.

(21) Appl. No.: 14/993,117

(22) Filed: Jan. 12, 2016

(51) Int. Cl.
*B60B 33/00* (2006.01)
*A45C 5/14* (2006.01)

(52) U.S. Cl.
CPC ...... *B60B 33/0039* (2013.01); *B60B 33/0057* (2013.01); *B60B 33/0068* (2013.01); *A45C 5/143* (2013.01); *B60B 2200/45* (2013.01); *B60B 2360/10* (2013.01); *B60B 2360/32* (2013.01); *B60B 2900/111* (2013.01)

(58) Field of Classification Search
CPC ............ B60B 33/0028; B60B 33/0036; B60B 33/0039; B60B 33/0042; B60B 33/0044; B60B 33/0047; B60B 33/0049; B60B 33/0057; A45C 5/14; A45C 5/141; A45C 5/143; A45C 7/006; B65D 90/18
See application file for complete search history.

(56) References Cited

U.S. PATENT DOCUMENTS

| | | | | |
|---|---|---|---|---|
| 978,161 A * | 12/1910 | Holmes | ............... | B60B 33/0028 16/40 |
| 4,045,096 A * | 8/1977 | Lidov | ..................... | B60B 3/048 16/26 |
| 5,215,356 A * | 6/1993 | Lin | ..................... | B60B 33/0042 16/30 |
| 5,303,450 A * | 4/1994 | Lange | .................. | B60B 33/021 16/35 D |
| 5,394,589 A * | 3/1995 | Braeger | ............. | B60B 33/0028 16/44 |
| 6,839,939 B2 * | 1/2005 | Donakowski | ........... | B60B 3/048 16/18 R |
| 7,150,070 B2 * | 12/2006 | Donakowski | ........... | B60B 3/048 16/18 R |
| 7,647,673 B2 * | 1/2010 | Melara | .................... | B60B 3/048 16/18 R |
| 7,657,969 B2 * | 2/2010 | Trivini | .................... | B60B 3/048 16/35 R |
| 7,725,986 B2 * | 6/2010 | Tsai | ........................ | B60B 3/048 16/46 |
| 8,312,595 B2 * | 11/2012 | Trivini | ................ | B60B 33/0028 16/35 R |
| 8,393,053 B2 * | 3/2013 | Melara | .................... | B60B 3/048 16/29 |
| 8,549,705 B1 * | 10/2013 | Wu | ..................... | B60B 33/0028 16/31 A |

(Continued)

*Primary Examiner* — Jeffrey O Brien
(74) *Attorney, Agent, or Firm* — Alan D. Kamrath; Kamrath IP Lawfirm, P.A.

(57) ABSTRACT

A castor for a suitcase includes a fixed seat, a wheel support, a hollow axle, two roller modules, and two caps. The fixed seat is mounted on a suitcase. The wheel support is mounted on the fixed seat and provided with two ears each having a transverse axle hole provided with a plurality of locking grooves. The hollow axle extends through the transverse axle hole of each of the two ears. The roller modules are mounted on the hollow axle and arranged between the ears. Each of the caps is provided with a plurality of locking hooks locked into the locking grooves of the transverse axle hole of one of the ears. Thus, when one of the roller modules cannot be rotated, the other one of the roller modules can be rotated freely.

12 Claims, 8 Drawing Sheets

(56) References Cited

U.S. PATENT DOCUMENTS

| | | | | |
|---|---|---|---|---|
| 8,561,258 B2* | 10/2013 | Breyer | .................... | B60B 3/048 16/45 |
| 8,764,120 B2* | 7/2014 | Scicluna | ................ | B60B 1/006 301/100 |
| 8,863,355 B1* | 10/2014 | Lee | .................... | B60B 33/0042 16/46 |
| 9,162,529 B2* | 10/2015 | Minato | ............... | B60B 33/0028 |
| 9,168,689 B2* | 10/2015 | Stoehr | .................. | B60B 27/001 |
| D766,073 S * | 9/2016 | Hozumi | ........................ | D8/375 |
| 2005/0081329 A1* | 4/2005 | Tsai | .................... | B60B 33/0028 16/18 R |
| 2007/0120416 A1* | 5/2007 | Pusch | ................ | B60B 33/0028 301/64.304 |
| 2012/0233809 A1* | 9/2012 | Lee | .................... | B60B 33/0039 16/45 |
| 2015/0113766 A1* | 4/2015 | Hou | ........................ | A45C 5/14 16/45 |
| 2016/0270496 A1* | 9/2016 | Pitchforth | ................ | A45C 7/00 |

* cited by examiner

FIG · 4

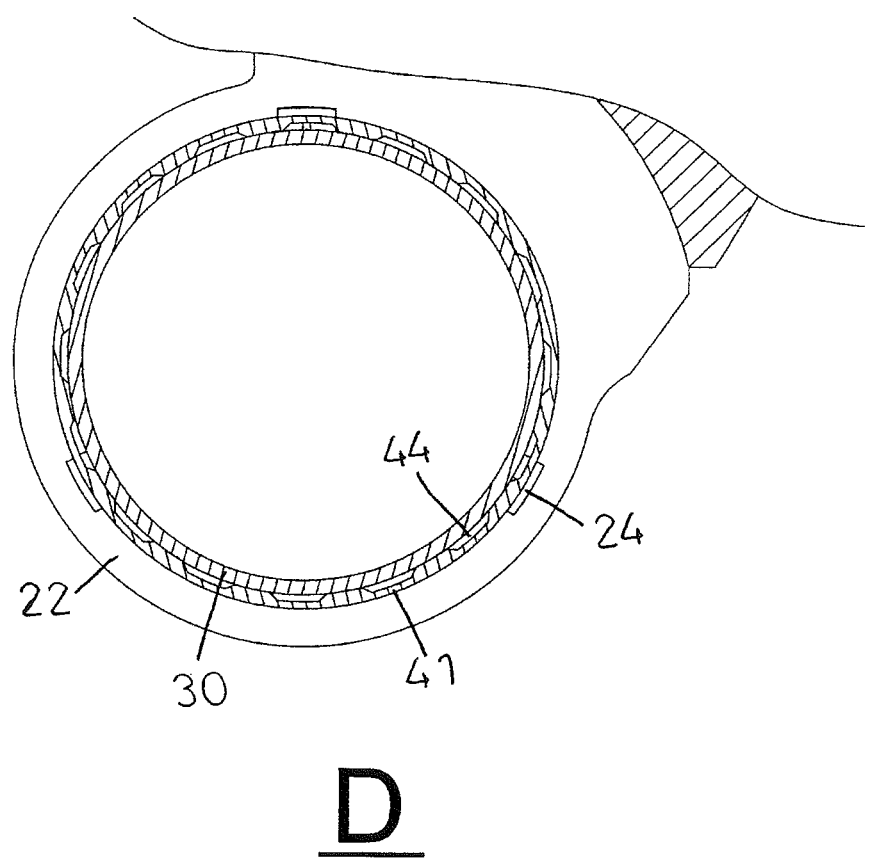
FIG·6

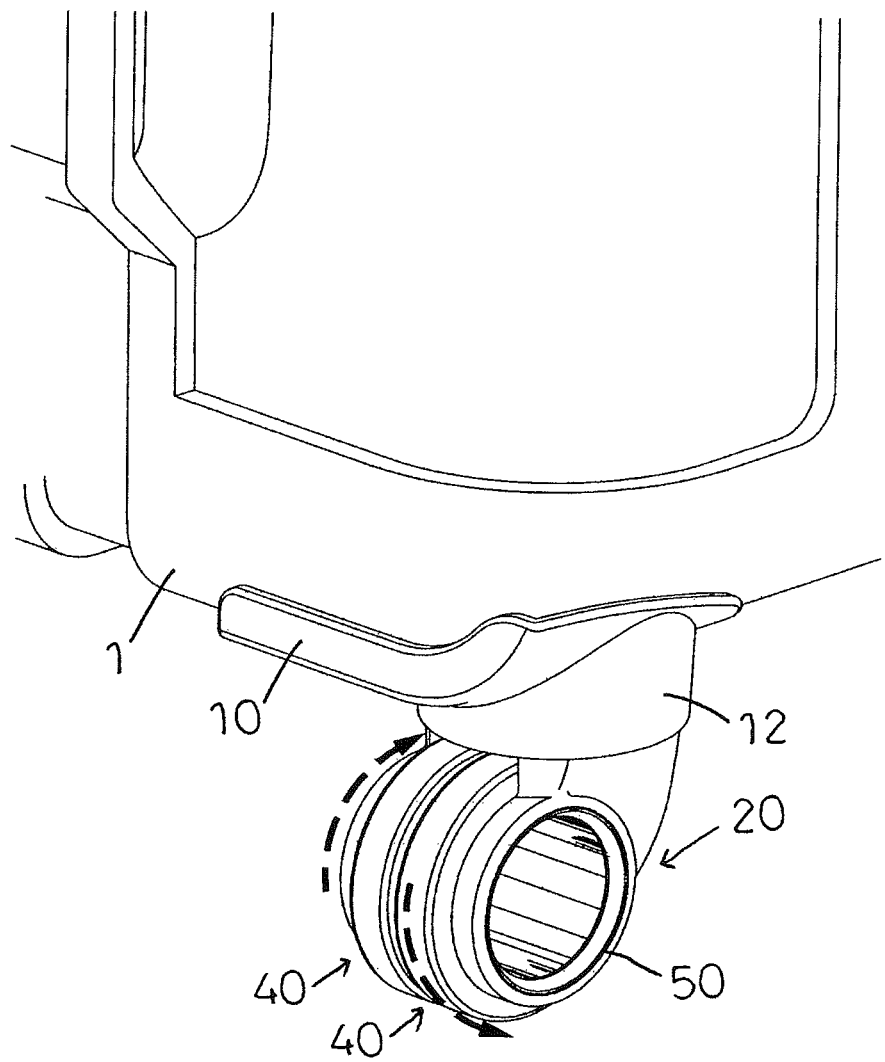
FIG·7

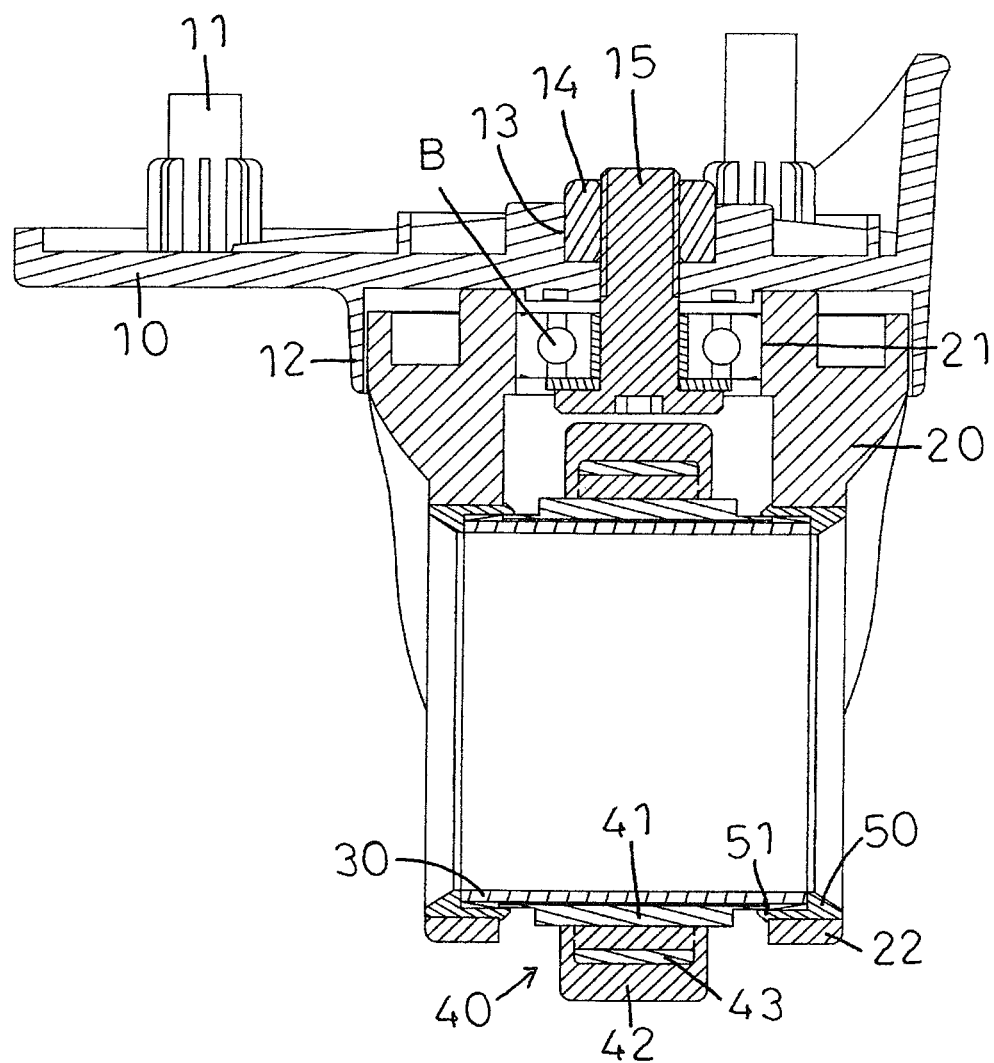
FIG·8

HOLLOW CASTOR FOR SUITCASE

BACKGROUND OF THE INVENTION

1. Field of the Invention

The present invention relates to a castor and, more particularly, to a hollow castor for a suitcase.

2. Description of the Related Art

A conventional castor, for a suitcase, chair or the like, comprises a cylinder having two end portions and two rollers mounted on the two end portions of the cylinder. The conventional castor also comprises many other components. However, the conventional castor is not assembled easily and conveniently. In addition, the conventional castor has a complicated structure, is not made easily and has a high cost of fabrication. Further, each of the two rollers is mounted on the cylinder by an annular member so that when one of the rollers is worn out, the rollers cannot be replaced individually, and the user has to replace the whole castor, thereby increasing the cost. Further, each of the two end portions of the cylinder is provided with an annular groove to receive the annular member, and each of the two rollers is also provided with an annular groove to receive the annular member, so that the parts of the castor are not made easily, thereby increasing the cost of fabrication.

BRIEF SUMMARY OF THE INVENTION

In accordance with the present invention, there is provided a castor for a suitcase, comprising a fixed seat, a wheel support, a hollow axle, two roller modules, and two caps. The fixed seat is mounted on four corners of a bottom of a suitcase and has a bottom face provided with a receiving recess for mounting the wheel support. The wheel support is provided with two ears extending downward from two opposite sides thereof. Each of the two ears is provided with a transverse axle hole for mounting the hollow axle. The transverse axle hole of each of the two ears has an inner peripheral wall provided with a plurality of locking grooves for locking each of the two caps. The transverse axle hole of each of the two ears has an outer side provided with an inner stepped edge. The hollow axle extends through the transverse axle hole of each of the two ears and has an outer diameter equal to an inner diameter of the transverse axle hole of each of the two ears. The two roller modules are mounted on an outer peripheral portion of the hollow axle. The two roller modules are arranged between the two ears of the wheel support and are rotatable freely on the hollow axle in two opposite directions. Each of the two caps is provided with a plurality of locking hooks locked into the locking grooves of the transverse axle hole of one of the two ears.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 6 is a cross-sectional view of the castor taken along mark "D" as shown in FIG. 4.

FIG. 7 is a schematic operational view of the castor as shown in FIG. 1 in use.

FIG. 8 is a cross-sectional view of a castor in accordance with another preferred embodiment of the present invention.

DETAILED DESCRIPTION OF THE INVENTION

Figure 1:
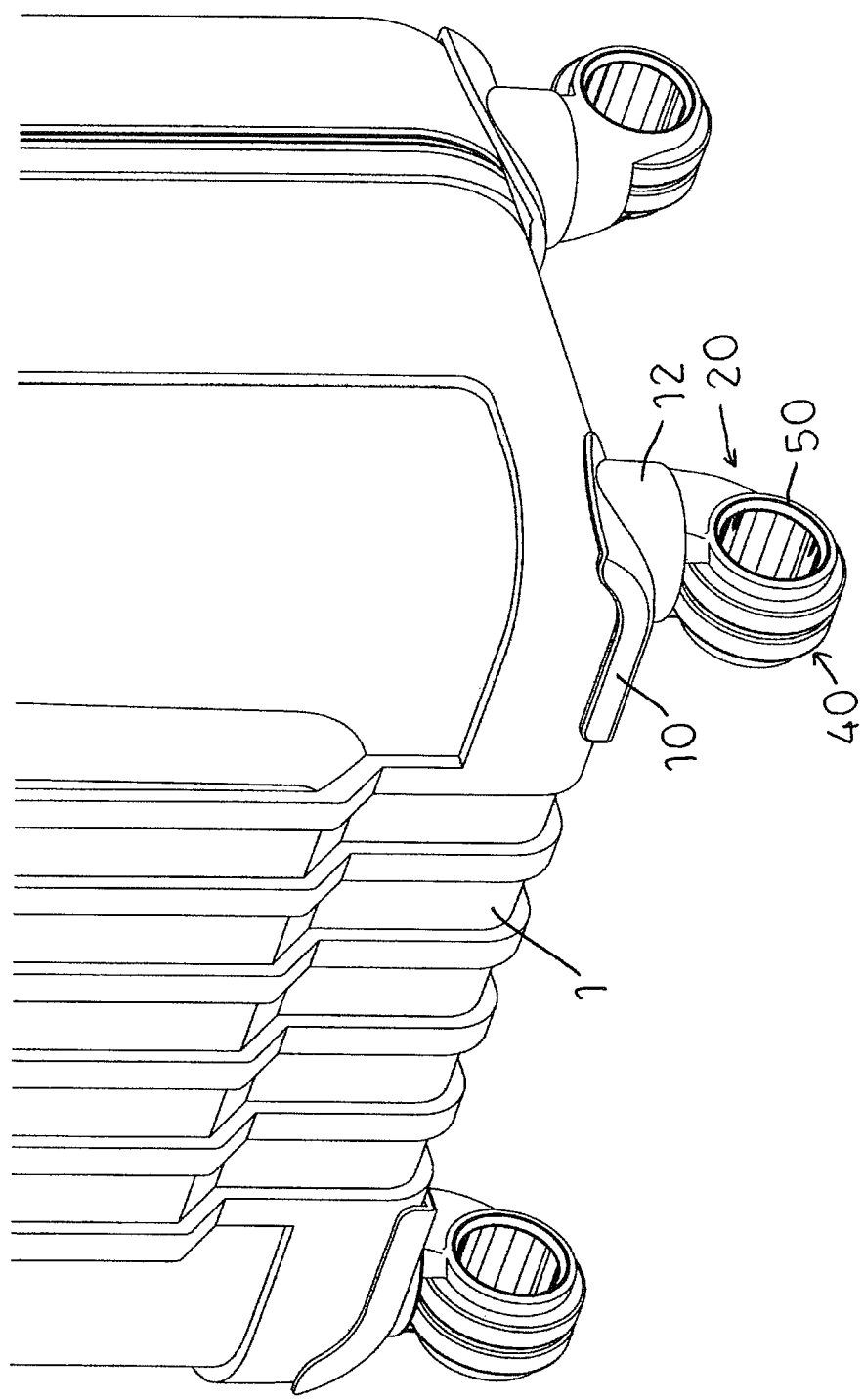
FIG. 1 is a perspective view of a castor mounted on a suitcase in accordance with the preferred embodiment of the present invention.
Figure 2:
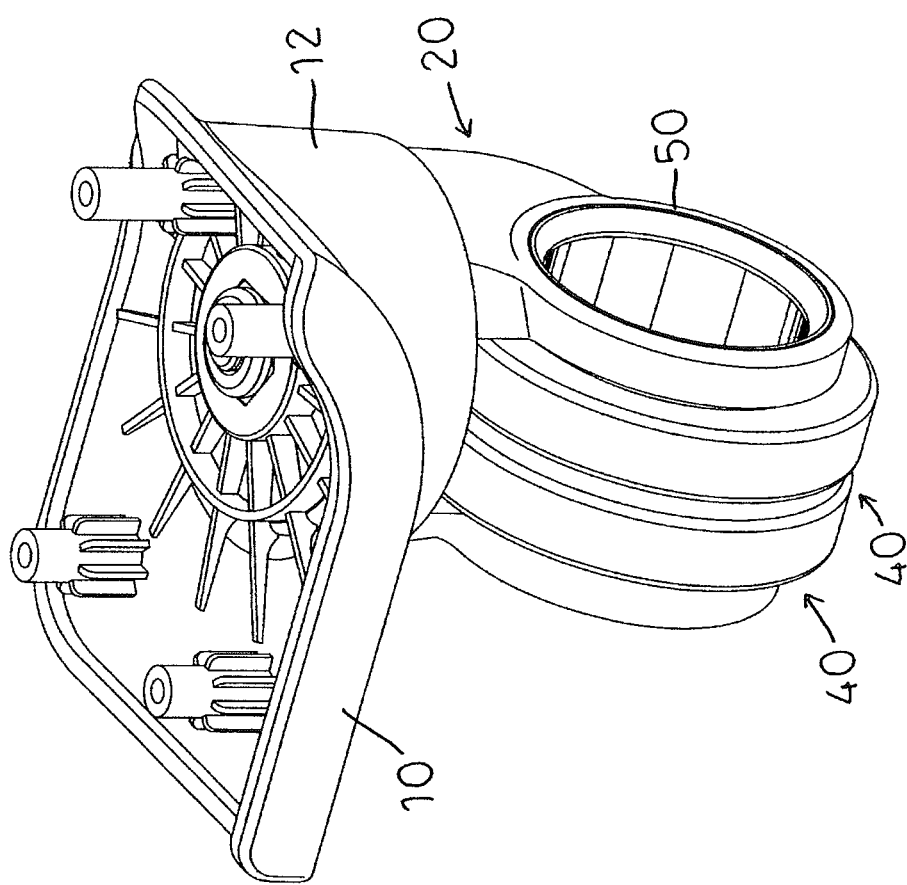
FIG. 2 is a perspective view of the castor in accordance with the preferred embodiment of the present invention.
Figure 3:
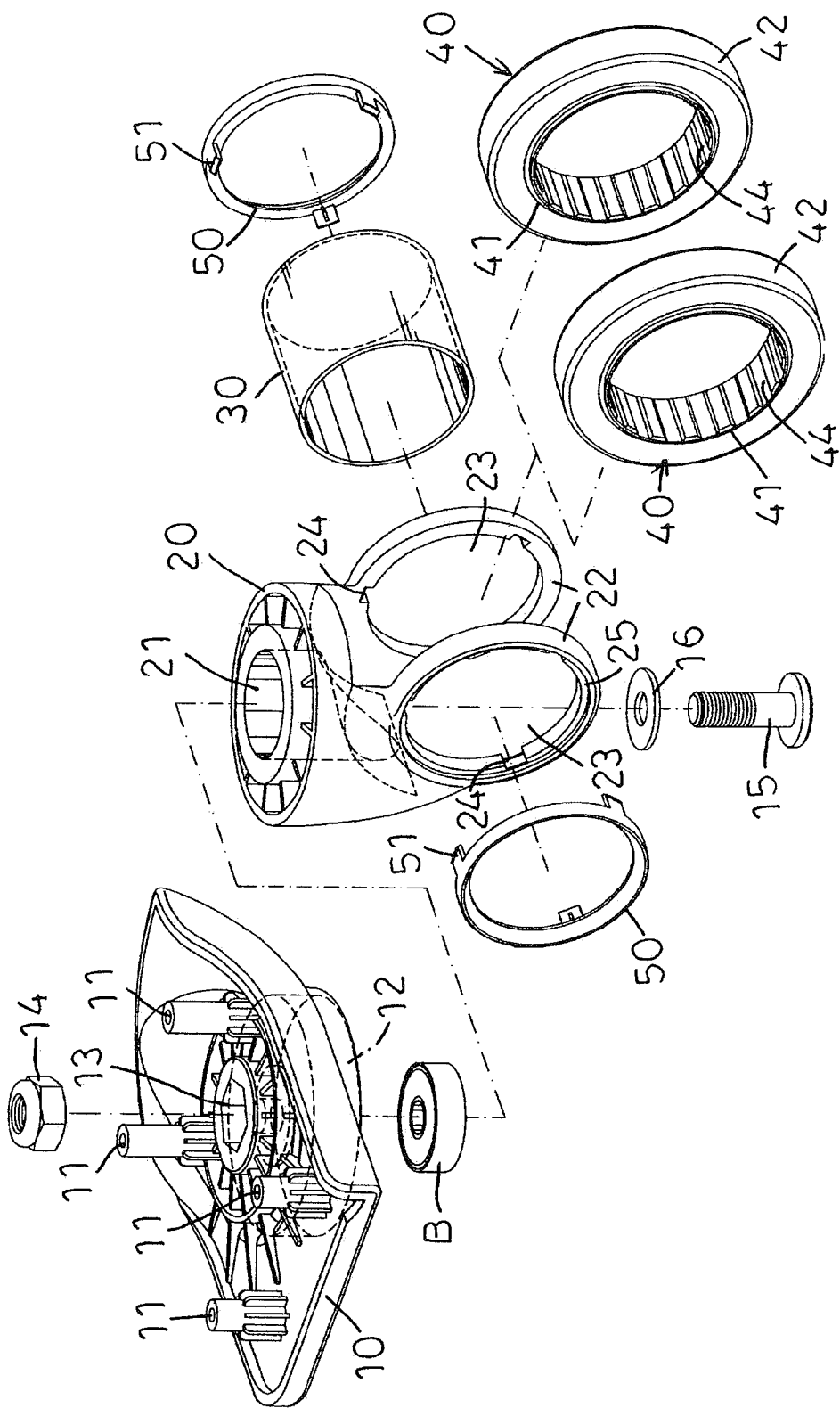
FIG. 3 is an exploded perspective view of the castor as shown in FIG. 2.

Referring to the drawings and initially to FIGS. 1-6, a castor in accordance with the preferred embodiment of the present invention comprises a fixed seat 10, a wheel support 20, a hollow axle 30, two roller modules 40, and two caps 50.

The fixed seat 10 is mounted on four corners of a bottom of a suitcase 1 and has a bottom face provided with a receiving recess 12 for mounting the wheel support 20. The receiving recess 12 of the fixed seat 10 has a circular shape.

The wheel support 20 has a circular shape and is made of plastic material. The wheel support 20 is provided with two ears 22 extending downward from two opposite sides thereof. Each of the two ears 22 is provided with a transverse axle hole 23 for mounting the hollow axle 30. The transverse axle hole 23 of each of the two ears 22 has an inner peripheral wall provided with a plurality of locking grooves 24 for locking each of the two caps 50. The transverse axle hole 23 of each of the two ears 22 has an outer side provided with an inner stepped edge 25 for mounting each of the two caps 50.

The hollow axle 30 extends through the transverse axle hole 23 of each of the two ears 22 and has an outer diameter equal to an inner diameter of the transverse axle hole 23 of each of the two ears 22.

The two roller modules 40 are mounted on an outer peripheral portion of the hollow axle 30 so that each of the two roller modules 40 is rotatable freely on the hollow axle 30 along a transverse axis. The two roller modules 40 are arranged between the two ears 22 of the wheel support 20 and are rotatable freely on the hollow axle 30 in two opposite directions.

Each of the two caps 50 is provided with a plurality of locking hooks 51 locked into the locking grooves 24 of the transverse axle hole 23 of one of the two ears 22. Thus, the hollow axle 30 and the two roller modules 40 are assembled on the wheel support 20 to form an integral body so that the hollow axle 30 is fixed and immobile by restriction of the two caps 50.

In the preferred embodiment of the present invention, the fixed seat 10 has a top face provided with a plurality of threaded posts 11 affixed to the bottom of the suitcase 1 by a plurality of screws (not shown).

In the preferred embodiment of the present invention, the fixed seat 10 is provided with a hexagonal hole 13 located at a center of the receiving recess 12. A nut 14 is mounted in the hexagonal hole 13 of the fixed seat 10. The wheel support 20 has a center provided with an upright shaft hole 21. A bearing "B" is mounted in the upright shaft hole 21 of the wheel support 20. A fastening screw 15 extends through a washer 16 and the bearing "B" and is screwed into the nut 14 so that the wheel support 20 is pivotally mounted on and rotatable freely relative to the fixed seat 10 along a vertical axis.

In the preferred embodiment of the present invention, the hollow axle 30 is made of metallic material with a light weight and a heat radiating feature. The metallic material of the hollow axle 30 is preferably aluminum.

In the preferred embodiment of the present invention, each of the two roller modules 40 includes a wheel rim 41 and a roller 42 combined together. The wheel rim 41 of each of the two roller modules 40 is preferably made of an aerospace metal or an alloy or plastics. The roller 42 of each of the two roller modules 40 is preferably made of plastic material. The wheel rim 41 of each of the two roller modules 40 is provided with a plurality of coupling portions 43 so that the wheel rim 41 and the roller 42 of each of the two roller modules 40 are combined tightly and closely during an injection molding process. The wheel rim 41 of each of the two roller modules 40 has an inner peripheral wall provided with a plurality of channels 44 parallel with an axial center of the wheel rim 41, and a lubricating oil is applied on the channels 44.

Figure 4:
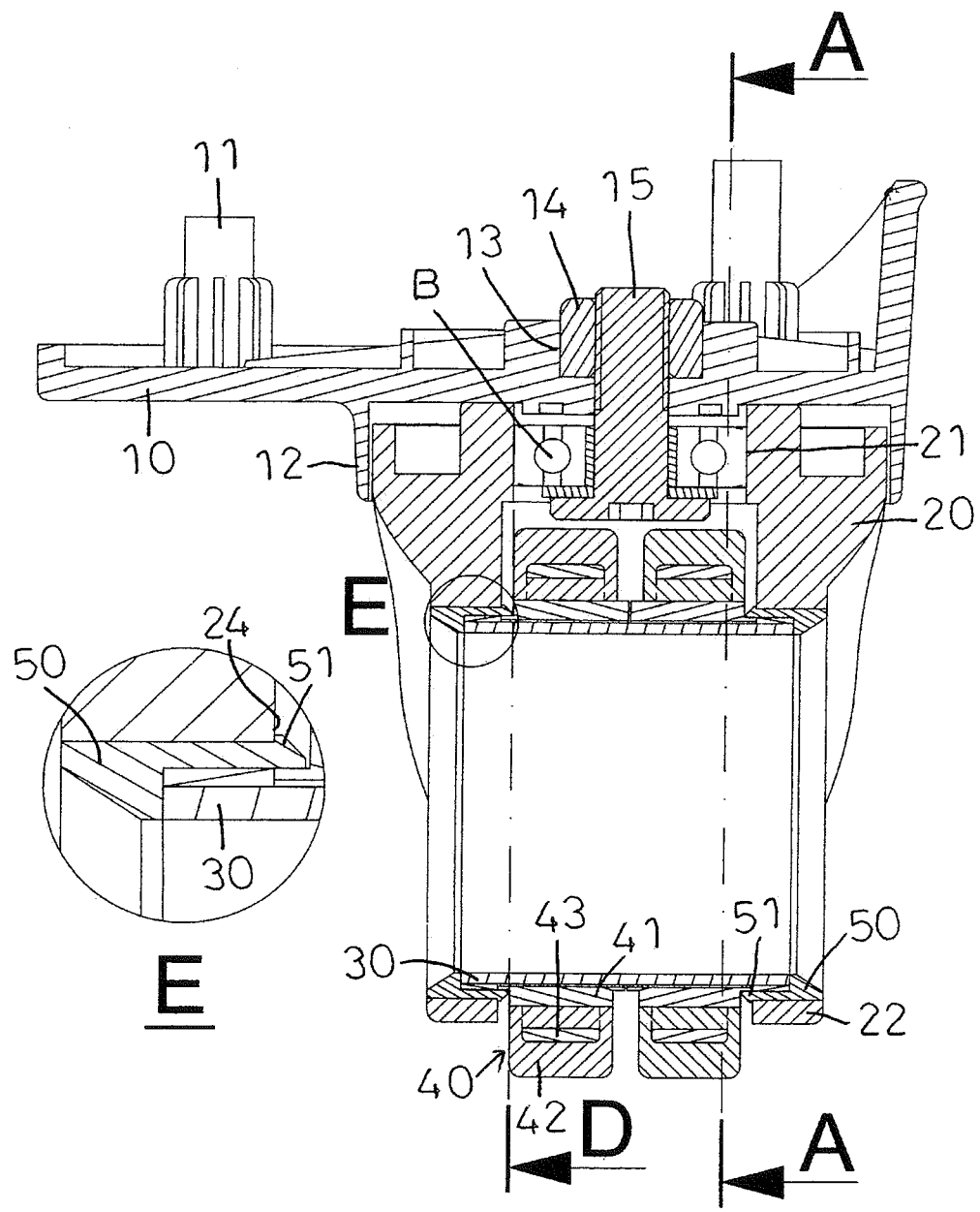
FIG. 4 is a cross-sectional view of the castor and a locally enlarged view taken along mark "E".
Figure 5:
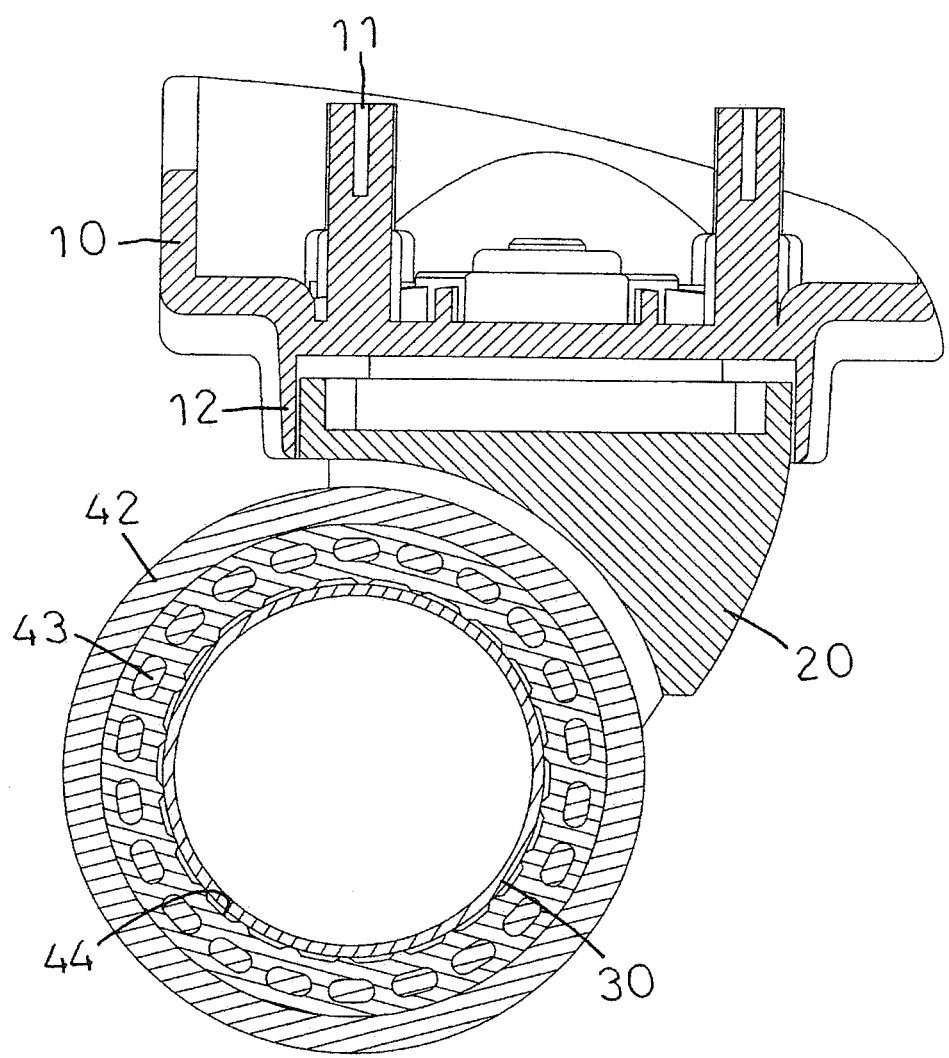
FIG. 5 is a cross-sectional view of the castor taken along line A-A as shown in FIG. 4.

In operation, referring to FIG. 7 with reference to FIGS. 1-6, the two roller modules 40 are mounted on the hollow axle 30 respectively and independently, so that the two roller modules 40 can be rotated freely on the hollow axle 30 in two opposite directions as shown in FIG. 4. Thus, when one of the two roller modules 40 is jammed and cannot be rotated, the other one of the two roller modules 40 can be rotated freely.

Accordingly, the two roller modules 40 are directly mounted on the hollow axle 30, and the locking hooks 51 of each of the two caps 50 are directly locked into the locking grooves 24 of one of the two ears 22 to attach each of the two caps 50 to the wheel support 20, so that the castor is assembled easily and quickly. In addition, when the two roller modules 40 are worn out, the user only needs to replace the two roller modules 40 without having to change or throw away the whole castor, thereby saving the cost. Further, when the two caps 50 are removed from the wheel support 20, the hollow axle 30 is drawn from the wheel support 20 to release the two roller modules 40 from the wheel support 20, so that the two roller modules 40 are replaced easily and quickly. Further, the castor has a simple construction, is made easily and has a low cost of fabrication. Further, when one of the two roller modules 40 is jammed and cannot be rotated, the other one of the two roller modules 40 can be rotated freely so that the castor functions when one of the two roller modules 40 is inoperative.

Referring to FIG. 8, the castor in accordance with another preferred embodiment of the present invention comprises a single roller module 40 mounted on the hollow axle 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A castor for a suitcase, comprising:
a fixed seat, a wheel support, a hollow axle, a roller module, and two caps;
wherein:
the fixed seat is mounted on four corners of a bottom of a suitcase and has a bottom face provided with a receiving recess for mounting the wheel support;
the wheel support is provided with two ears extending downward from two opposite sides thereof;
each of the two ears is provided with a transverse axle hole for mounting the hollow axle;
the transverse axle hole of each of the two ears has an inner peripheral wall provided with a plurality of locking grooves for locking each of the two caps;
the transverse axle hole of each of the two ears has an outer side provided with an inner stepped edge;
the hollow axle extends through the transverse axle hole of each of the two ears and has an outer diameter equal to an inner diameter of the transverse axle hole of each of the two ears;
the roller module is mounted on an outer peripheral portion of the hollow axle;
the roller module is arranged between the two ears of the wheel support and is rotatable freely on the hollow axle; and
each of the two caps is provided with a plurality of locking hooks locked into the locking grooves of the transverse axle hole of one of the two ears.

2. The castor for a suitcase of claim 1, wherein the fixed seat has a top face provided with a plurality of threaded posts affixed to the bottom of the suitcase by a plurality of screws.

3. The castor for a suitcase of claim 1, wherein the fixed seat is provided with a hexagonal hole located at a center of the receiving recess, a nut is mounted in the hexagonal hole of the fixed seat, the wheel support has a center provided with an upright shaft hole, a bearing is mounted in the upright shaft hole of the wheel support, and a fastening screw extends through a washer and the bearing and is screwed into the nut so that the wheel support is rotatable freely relative to the fixed seat.

4. The castor for a suitcase of claim 1, wherein the hollow axle is made of metallic material with a light weight and a heat radiating feature, and the metallic material of the hollow axle is aluminum.

5. The castor for a suitcase of claim 1, wherein the roller module includes a wheel rim and a roller combined together, the wheel rim the roller module is made of an aerospace metal or an alloy or plastics, the roller of the roller module is made of plastic material, and the wheel rim of the roller module is provided with a plurality of coupling portions so that the wheel rim and the roller of the roller module are combined tightly and closely during an injection molding process.

6. The castor for a suitcase of claim 5, wherein the wheel rim of the roller module has an inner peripheral wall provided with a plurality of channels parallel with an axial center of the wheel rim, and a lubricating oil is applied on the channels.

7. A castor for a suitcase, comprising:
a fixed seat, a wheel support, a hollow axle, two roller modules, and two caps;
wherein:
the fixed seat is mounted on four corners of a bottom of a suitcase and has a bottom face provided with a receiving recess for mounting the wheel support;
the wheel support is provided with two ears extending downward from two opposite sides thereof;
each of the two ears is provided with a transverse axle hole for mounting the hollow axle;
the transverse axle hole of each of the two ears has an inner peripheral wall provided with a plurality of locking grooves for locking each of the two caps;
the transverse axle hole of each of the two ears has an outer side provided with an inner stepped edge;

the hollow axle extends through the transverse axle hole of each of the two ears and has an outer diameter equal to an inner diameter of the transverse axle hole of each of the two ears;

the two roller modules are mounted on an outer peripheral portion of the hollow axle;

the two roller modules are arranged between the two ears of the wheel support and are rotatable freely on the hollow axle in two opposite directions; and each of the two caps is provided with a plurality of locking hooks locked into the locking grooves of the transverse axle hole of one of the two ears.

8. The castor for a suitcase of claim 7, wherein the fixed seat has a top face provided with a plurality of threaded posts affixed to the bottom of the suitcase by a plurality of screws.

9. The castor for a suitcase of claim 7, wherein the fixed seat is provided with a hexagonal hole located at a center of the receiving recess, a nut is mounted in the hexagonal hole of the fixed seat, the wheel support has a center provided with an upright shaft hole, a bearing is mounted in the upright shaft hole of the wheel support, and a fastening screw extends through a washer and the bearing and is screwed into the nut so that the wheel support is rotatable freely relative to the fixed seat.

10. The castor for a suitcase of claim 7, wherein the hollow axle is made of metallic material with a light weight and a heat radiating feature, and the metallic material of the hollow axle is aluminum.

11. The castor for a suitcase of claim 7, wherein each of the two roller modules includes a wheel rim and a roller combined together, the wheel rim of each of the two roller modules is made of an aerospace metal or an alloy or plastics, the roller of each of the two roller modules is made of plastic material, and the wheel rim of each of the two roller modules is provided with a plurality of coupling portions so that the wheel rim and the roller of each of the two roller modules are combined tightly and closely during an injection molding process.

12. The castor for a suitcase of claim 11, wherein the wheel rim of each of the two roller modules has an inner peripheral wall provided with a plurality of channels parallel with an axial center of the wheel rim, and a lubricating oil is applied on the channels.

\* \* \* \* \*